3,340,172
TWO PHASE AQUEOUS EMULSION SUITABLE FOR ELECTROPHORETIC COATING AND PROCESS FOR USE THEREOF
Olin W. Huggard, Rocky River, Ohio, assignor to Mobil Oil Corporation, a corporation of New York
No Drawing. Filed June 28, 1966, Ser. No. 561,038
11 Claims. (Cl. 204—181)

The present application is a continuation-in-part of my prior application Ser. No. 367,540, filed May 14, 1964, which is a continuation-in-part of my prior application Ser. No. 281,027, filed May 16, 1963, now U.S. Patent 3,297,557, which, in turn, is a continuation-in-part of my prior application Ser. No. 196,467, filed May 21, 1962, now abandoned.

The present invention relates to the electrophoretic deposition of organic resinous coatings. The said prior applications are directed to the efficient deposition of smooth resinous films of superior chemical resistance from aqueous medium onto a conductive surface and include numerous features relating to the resin systems which are used and their maintenance during continuous operation. The present development carries forward certain refinements in my prior work which enable the electrodeposited film to cure in the absence of air by means of an interaction between a reactive resin at least partially dissolved in the continuous aqueous phase of the electrophoretic bath, and a curing agent therefor which is incorporated in the internal or dispersed phase of the electrophoretic bath which comprises an oil soluble resin maintained in dispersion by the resin in the continuous phase which may be characterized as a film-forming emulsifying agent.

The electrophoretic deposition of organic resinous coatings from aqueous medium is well known, but it has achieved only limited recognition in commerce despite the obvious advantage inherent in the use of water systems and the direct application coating from a system of minimum solvent content to an article in its final physical form.

More particularly, a commercially feasible system must provide numerous properties in combination, including stability, low current requirements for electrodeposition, effective electrodeposition using direct current of low amperage, the capacity to deposit a film in deep recesses, good flow at low solvent content or even in the absence of solvent, and the capacity to be water insoluble immediately upon electrical deposition and to cure to provide superior chemical resistance and weather resistance. Since a desirable commercial system must possess all of these divergent characteristics in some considerable degree, the provision of a practical system is a difficult matter. This is especially true when an attempt is made to employ reactive materials capable of curing when baked even when air is not available to assist the cure.

In accordance with the present invention, an aqueous emulsion adapted to efficiently deposit a water insoluble film upon electrophoretic deposition is provided by dispersing oil-soluble resin as hereinafter defined in a continuous aqueous phase containing dissolved emulsifying agent consisting essentially of a salt of a base with a film forming polycarboxylic acid. The film forming component of the emulsifying agent is desirably the heat-reaction product of aliphatic alpha,beta-ethylenically unsaturated carboxylic acid with polyester of unsaturated fatty acid and aliphatic polyhydric alcohol having an acid number of at least 40, preferably at least 80, as described in my said prior applications. This film forming emulsifying agent is cured with a curing agent which is incorporated in the dispersed oil soluble resin. The oil-soluble resin which is dispersed should desirably include reactive groups to enable partial pre-reaction with the curing agent whereby the curing agent is prevented from leaching into the aqueous phase where it can disturb the stability of the system. This oil soluble resin, as set forth in my prior applications, is desirably a resinous polyol at least partially esterified with monobasic carboxylic acid providing easy flowability and compatibility with the emulsifying agent. The resinous polyol is preferably esterified only partially to leave some hydroxy groups unreacted for reaction with the curing agent. Numerous other resins can be used in the various phases as will be more fully pointed out hereinafter.

The aqueous emulsions of the invention can be provided in stable form and are well adapted for electrophoretic deposition to provide compatible and easily flowable films which are water insoluble immediately upon deposition and which are heat curable even when covered by an overcoat, such as the guide coat frequently used, to provide superior resistance to corrosion and weathering and to cure sufficiently to properly hold out the enamels subsequently applied. Further, the enamels can be applied directly over the wet electrophoretically deposited coatings of the invention so that a single bake can be relied upon to cure both coatings, reliance being had upon the capacity of the coatings of the invention to cure in the absence of air.

In accordance with preferred practice of the invention, and as described in said prior applications, the electrophoretic coating system is operated in a substantially continuous manner which places a heavy burden on the stability of the system.

Thus, and in preferred practice, the aqueous emulsion being deposited electrophoretically is maintained by supplying two different supply materials or feeds. One of these feeds is a base deficient, essentially water-free, water-insoluble and solvent-reducible material which is supplied in an organic solvent medium containing the oil-soluble resin partially pre-reacted with the selected curing agent. The emulsifying film forming polycarboxylic acid is also present. The second supply component is a highly pigmented, essentially base-satisfied, water-bearing and water-reducible mixture which is capable of being assimilated within the aqueous emulsion constituting the electrophoretic bath by mere mixing. This water reducible mixture contains a portion of the film forming polycarboxylic acid emulsifying agent which, after electrodeposition, is cured utilizing the curing agent in the oil-soluble phase.

As pointed out in my prior applications, the use of a dual feed as described not only avoids detrimental accumulation of water and base, but it also includes the provision of a pigment supply in which the pigment is associated with base-satisfied resin thereby protecting the acid-sensitive pigments which are preferred for good corrosion resistance from resins possessing considerable acidity.

It is desired to point out that the preferred base is an amine, especially when continuous processing is contemplated as indicated above.

It is also desirable to use mixed solvents as referred to in my prior applications.

The advantages of the invention as well as the practice thereof will be more fully understood from the description which follows.

As previously indicated, the invention employs an aqueous emulsion having a continuous aqueous phase and an oil soluble phase stably dispersed therein with the oil soluble phase comprising an oil soluble resin and a curing agent for the polycarboxylic resin which is used in the aqueous phase to emulsify the dispersed particles of oil soluble materials. In preferred practice, the curing agent is also reactive with the oil soluble resin and is partially prereacted therewith. Under the conditions of stoichiometry and acidity prevailing in the oil phase, the system is stable for long periods of time at room temperature. It is to be noted that electrophoresis changes the stoichiometry by adding large quantities of acidic resin which also changes acidity and prepares the deposited mixture of resin for cure at elevated temperature.

The continuous aqueous phase contains dissolved salt, preferably volatile nitrogenous base salt with the resinous film forming polycarboxylic acid emulsifying agent. This polycarboxylic resin is illustrated by a heat-reaction product provided by heat-reacting aliphatic alpha-beta-ethylenically unsaturated carboxylic acid with polyester of unsaturated fatty acid and aliphatic polyhydric alcohol, the heat-reaction product having an acid number of at least 40, preferably at least 80. The polyester is usually an unsaturated triglyceride oil.

As more fully described in my prior applications, an an aliphatic alpha, beta-unsaturated carboxylic acid is first reacted with an unsaturated oil to couple the two together. Any unsaturated oil may be used in accordance with the invention. It is preferred to employ oils which are triglycerides of unsaturated fatty acids, but unsaturated fatty acid esters of other aliphatic polyols such as tall oil esters of pentaerthyritol or trimethylol propane may be used. Preferred oils are dehydrated castor oil, soya oil, linseed oil, tung oil, oiticica oil or safflower oil. The oil can be bodied by heat, catalyst or monomer additives, as is known. Bodied oils are desirably used.

Any aliphatic alpha, beta-unsaturated carboxylic acid may be used in accordance with the invention. The preferred acids are monoethylenically unsaturated and dicarboxylic. The presently preferred acid is fumaric acid, but maleic acid is also good. Other acids from the class already defined, such as crotonic acid, acrylic acid and sorbic acid may be used. The term "acid" is intended to broadly include the acid in the form of its anhydride, e.g., maleic anhydride may be used, though the presence of anhydride groups in the final product is not preferred and is desirably avoided. Thus, and to obtain best results, the anhydride groups are preferably eliminated from the product as by hydrolysis and/or by esterification or the acid is used in the form of free acid, preferably fumaric acid, and reaction conditions are selected to substantially preclude the elimination of water during the formation and bodying of the oil-acid adduct and the consequent formation of the less desired anhydride group.

Anhydrides, and particularly maleic anhydride, can be used with considerable effectiveness if the final product is blown with steam or reacted with water for several hours in order to eliminate substantially all of the anhydride in order to eliminate substantially all of the anhydride groups by converting the same to a pair of carboxylic acid groups.

It is of interest to note that when acid value is determined by titration with alcoholic potassium hydroxide, that one molecule of potassium hydroxide is consumed per anhydride molecule. On the other hand, when titration is effected with aqueous potassium hydroxide, then each anhydride group is capable of functioning as though it were a pair of carboxyl groups so that the acid value for a resin containing anhydride groups is always higher when titration is with aqueous potassium hydroxide than it is when titration is with alcoholic potassium hydroxide.

Titration in alcoholic potassium hydroxide and aqueous potassium hydroxide should provide acid values not more than 5 acid number units apart which is indicative of the substantial absence of the anhydride group.

The reaction product of oil and acid should contain sufficient acid as defined by its acid number to provide a polycarboxylic acid resin which can be reacted with a base, e.g., volatile nitrogenous base, to combine with the acid reaction product to form a water dispersible salt, the term "water dispersible" including materials which dissolve or which can be reduced in water. This salt functions as an emulsifying agent for the oil soluble resin. Preferably, the salt is dissolved in the continuous aqueous phase of the emulsion.

It is presently preferred to employ as little acid as possible leading to water solubility to provide films having the greatest resistance to corrosion. This provides ample carboxyl functionality for subsequent cure. Also, it is particularly preferred to employ materials of maximum body or viscosity consistent with water solubility. Acrylic acid is desirably used in amounts of from about 1 to about 5% based on the weight of the adduct, preferably together with up to about 25% based on the weight of the adduct of other vinyl monomers such as styrene, vinyl toluene, methyl methacrylate or acrylonitrile, to increase the viscosity of the preferred adduct by copolymerization. Based on total vinyl monomer, the acid monomer is desirably used in an amount of from 2–50% by weight. In such instance, the total weight of acid in the final bodied adduct is preferably within the range of from 5–30% by weight, based on total weight of final bodied adduct especially when fumaric acid is the principal acid component, e.g., at least 60% of total acid.

Still another way in which to employ oils is to copolymerize them with an unsaturated material prior to reaction with the unsaturated acid, such a reaction being typified by the utilization of a proportion of cyclopentadiene-modified linseed oil. Of course, one may also compromise properties by utilizing mixtures. To illustrate this, one might use a 50/50 weight ratio mixture of cyclopentadiene-modified linseed oil adduct with dehydrated castor oil, this mixture being fumarated or maleated to provide the bodied adduct desired in accordance with the invention.

The reaction between the oil and the acid is broadly a relatively simple one and it is merely necessary to cook the oil into the acid as by heating the two together at an appropriate elevated temperature. Heating should be continued until a clear product is produced having the desired viscosity.

Viscosity can be built up in numerous ways, and efforts to build viscosity may precede, accompany or follow adduct formation. In preferred practice, the final adduct which is used has a viscosity measured at 220° F. at 100% solids of at least T, preferably at least V, on the Gardner scale, and is substantially devoid of anhydride groups.

The specific nature of the volatile nitrogenous base which is preferred is not a primary feature of the invention. In selecting the volatile base, the base is desirably of sufficient volatility to vaporize so that at least a large portion of the base will leave the film which is deposited during the operation of drying the film. Ammonia is a particularly preferred nitrogenous base because of its low cost. Other volatile bases such as volatile aliphatic amines are more costly, but provide excellent results. Nonvolatile bases may, less desirably, be used such as sodium and potassium which may be employed in the form of hydroxides or alkaline salts such as carbonates.

The proportion of base which is used is of secondary significance. Broadly, enough base is used to dissolve the heat-reaction product.

The oil-acid heat-reaction product is simply dissolved in water containing the selected base, preferably ammonia or a volatile aliphatic amine to provide the aqueous phase of the desired emulsion.

Referring more particularly to the oil-soluble phase which is dispersed in the continuous aqueous phase described hereinbefore, the resin component which is relied upon is desirably a resinous polyol which may be of various types as indicated hereinafter.

One type of resinous polyol which may be used is an hydroxy-functional resinous polyester, usually of the type which is commonly referred to as an alkyd resin. As is well known, these polyester resins are produced by a polyesterification reaction with phthalic acid or anhydride as the dicarboxylic acid and an aliphatic polyhydric alcohol containing at least three hydroxyl groups, usually glycerin or pentaerythritol either alone or together with a proportion of diol such as ethylene glycol or butane diol. The proportions of hydroxy-containing component is normally in excess, e.g., of from 5–35%, to provide the desired hydroxyl-functional polyester resin. This polyester resin is at least partially esterified with monocarboxylic acid and usually with an unsaturated fatty acid which can be accomplished by direct esterification with the acid, or, less desirably by transesterification with an oil containing the desired acid.

As is also well known, there are numerous possible variations such as the use of proportions of iso and/or terephthalic acids, the use of trimellitic anhydride, or the use of aliphatic dicarboxylic acids such as adipic acid. The point of importance is the provision of a resinous material carrying a plurality of hydroxyl groups and the at least partial esterification thereof with fatty acid to enhance flowability and compatibility.

Despite the variety of materials which may be used, the alkyd resin or polyester resin is desirably an hydroxy functional product permitting coreaction with the drying oil or drying fatty acid.

Preferred resinous polyols are allyl alcohol-containing resinous copolymers which are at least partially esterified with fatty acid to form the flowable and compatible esters which are desired in the oil-soluble dispersed phase.

Preferred allyl alcohol-containing copolymers are copolymers of from 1–40% by weight of an allyl alcohol such as allyl alcohol or methallyl alcohol or mixtures thereof with at least 30% by weight, preferably at least 50% by weight, of styrene, ring-substituted styrene in which the substituents may be halogen and/or lower alkyl radicals containing up to 4 carbon atoms and methyl methacrylate. Vinyl toluene is a preferred ring-substituted styrene. While the allyl alcohol-containing resinous copolymer can be liquid or solid, the copolymer which is solid at room temperature is preferred. The preferred copolymer components are nomally solid resins which include sufficient hydoxyl groups to correspond to an allyl alcohol content of from 10–30% by weight.

The allyl alcohol-containing copolymer may also include other monoethylenically unsaturated monomers. The presence of small amounts of some monomer, such as acrylic acid, is helpful in the production of the copolymer, e.g., by making the copolymerization more rapid or by increasing conversion of monomer to copolymer. The presence of other monomers may also be desirable for the purpose of balancing the physical properties of the copolymer. Thus, up to 50% by weight of the copolymer may be constituted by a monoethylenically unsaturated ester containing from 2–20 carbon atoms in a terminal aliphatic hydrocarbon chain, these being illustrated by ethyl acrylate, n-butyl acrylate, 2-ethylhexyl acrylate, butyl methacrylate, vinyl acetate, and vinyl stearate.

A particularly preferred copolymer of styrene and allyl alcohol, referred to hereinafter as styrene-allyl alcohol copolymer A, is prepared by copolymerization of styrene and allyl alcohol in a 50% by weight solution in xylene to provide a copolymer having the following characteristics:

Colorless, odorless, brittle solid.

| | |
|---|---|
| Softening point (Durran's) °C | 97 |
| Density (25° C.) | 1.10 |
| Molecular weight | 1150 |
| Hydroxy equivalents/100 gm. | 0.45 |
| Average —OH per mol | 5.2 |

Copolymers as described above may be prepared by heating the mixed monomers in the presence of a free-radical polymerization catalyst and in the absence of oxygen at a temperature of from 180 to 300° C., as is more fully taught in United States Patent No. 2,894,938.

Any monocarboxylic acid may be used for the esterification, especially those containing a long hydrocarbon chain of from 12–22 carbon atoms, preferably from 16–20 carbon atoms. Both saturated and unsaturated acids may be selected. Thus, the acids derived from linseed oil, coconut oil, cottonseed oil, dehydrated castor oil and other similar acids may be used. Tall oil fatty acids are considered to be typical and will be used to illustrate the invention. Rosin is another preferred acid which can be used for the esterification. The preferred extent of partial esterification is from 45–70% based on the hydroxyl content of the resinous polyol which desirably has an hydroxyl equivalent weight of from 70–450 grams.

Esterification provides a more fluid resin having lower viscosity and superior flow in the high solids films which are deposited by electrophoresis.

While preferred resinous polyols have been described hereinbefore, the invention is not limited to any specific resinous polyol, but instead any resinous polyol may be used, other suitable resinous polyols being illustrated by polyepoxides containing recurring secondary hydroxyl groups, such as a diglycidyl ether or bisphenol A having an hydroxyl value of 0.32 equivalent per 100 grams, and by vinyl chloride copolymers containing hydrolyzed or saponified vinyl acetate such as a copolymer of 87 weight percent of vinyl chloride and 13 weight percent of vinyl acetate which has been hydrolyzed to provide a vinyl alcohol content of 6%. Similarly, copolymers containing 5–25% by weight of 2-hydroxy ethyl acrylate or methacrylate may be used to provide resinous materials containing numerous hydroxy groups which can be at least partially esterified for use in the invention.

The oil soluble resinous component in accordance with the invention is dispersed in the aqueous phase and such dispersion as well as the fluidity of the film which is deposited is facilitated or enhanced by the presence of small proportions of organic solvents, especially those of only limited water miscibility. Suitable solvents are aromatic hydrocarbons such as toluene and xylene as well as commercial mixtures thereof such as Solvesso 100. Still other suitable solvents are pine oil and butanol. Still higher boiling water-insoluble alcohols are particularly preferred, such as isooctyl alcohol. The organic solvent is employed in an amount of from 5–40% by weight of the oil soluble solution, preferably in an amount of from 10–30% by weight of the oil soluble solution.

As will be evident, the invention employs two compatible resins, one of which is dissolved in the aqueous phase and which supplies carboxyl functionality when the volatile nitrogenous base evaporates, and the other of which carries a curing agent into contact with the polycarboxylic resin when the two resins are simultaneously electrodeposited. This other resin desirably includes a small amount of reactive groups, especially hydroxy groups, in order that the curing agent can be pre-associated therewith to minimize leaching thereof out of the oil phase and into the water phase where it might cause premature gelation. Proportions of those two resinous components is of secondary significance, weight ratios of from 10/90 to 90/10 being broadly useful. Preferred proportions are from 10/90 to 70/30.

As pointed out in my said prior applications, the oil soluble resin may contain a minor amount, such as 5–20% of the oil soluble resin, of heat-hardening aminoplast resins such as condensates of urea or melamine or other triazine with excess formaldehyde, the condensate being desirably etherified as with butanol to enhance its solvent solubility.

These heat-hardening formaldehyde condensates are reactive with the polycarboxylic acid resins which are dispersed in the aqueous phase of the emulsion and, when the electrophoretic deposit is baked in conventional fashion these materials react with one another to cure the deposit, such cure being independent of air oxidation. Similarly, other heat-hardening formaldehyde condensates such as heat-hardening condensates of excess formaldehyde phenols can be incorporated into the oil soluble resin to perform the same function in the same way.

While minor amounts of heat-hardening formaldehyde condensate are desirably used, it will be understood that proportions will vary widely depending upon the curing coreactants which are used and the extent of cure desired.

It should be noted that considerable variaiton is permissible in the chemical constitution of both the water soluble polycarboxylic acid resin as well as the oil soluble resin so long as these are reasonably compatible with one another in the film which is deposited and baked. Similarly, the curing agent is subject to wide variation so long as it is sufficiently polyfunctional to be the basis for an appropriate curing reaction. Resins, and especially low molecular weight resins carrying a plurality of alkylol groups are preferred (especially in etherified form), since these are partially pre-reacted by hot blending with an hydroxy-functional or carboxy-functional oil soluble resin and, at the same time, they function to enhance the cure of the resinous material which is electrodeposited. It is especially preferred to employ low molecular weight amine resins carrying a plurality of methoxymethyl groups which are hot blended with an oil soluble resin which is predominantly hydroxy-functional.

As will be appreciated, any resinous polycarboxylic acid having a sufficient acid content to be at least partially dissolved in water may be utilized as the film forming emulsifying agent.

In this respect, reference is made to any maleinized or fumarated oil or any acrylic copolymer of sufficient acid content for solubility in aqueous alkaline medium, such as a solution copolymer of 85 parts ethyl acrylate and 15 parts of acrylic acid. Correspondingly, the oil soluble resin may be any resinous material compatible with the resin dispersed in the water phase and insoluble in water, preference being had for hydroxy-functional resins which are more easily associated with the preferred curing agents, e.g., the methylol-functional curing agents. Thus, epoxy esters, resinous polyester, allyl alcohol copolymers, thermosetting acrylics based on hydroxylated vinyl monomers, such as hydroxy ethyl methacrylate, or allyl ethers of glycerin or methylolated acrylamide and the like may be employed. Even a fumarated oil of too low an acid value for dispersibility in aqueous alkaline medium may be used as the oil soluble resin. Thus, the oil soluble resin may contain carboxy groups. Similarly, the curing agent may vary widely, low molecular weight resinous curing agents being preferred. The curing agent need not be resinous, e.g., hexamethylene tetramine.

It is desired to stress that the invention is of particular applicability to the deposition of primers, and especially automotive primers, where a guide coat is frequently applied to the wet electrodeposited prime coat in order that the prime coat be covered with a thin adherent layer of contrasting color for the purpose of limiting subsequent sanding operations. However, the guide coat acts as a blanket preventing air from contacting and assisting in the cure of the drying oils which are frequently employed. As a result, the primer may not be sufficiently cured when baked and the subsequently applied enamels tend to be absorbed into the primer. The invention, by enabling a cure in the absence of air, insures that the enamel holdout will be acceptable and provides a better finished appearance to the final product. Thus, the invention is of particular interest to a non-oxidizing curing system.

The invention is illustrated in the examples which follow:

*Example I*

A base water soluble resin is made as follows:

44 parts of cyclopentadiene-modified linseed oil are admixed with 44 parts of dehydrated castor oil and heated to 450° F. in 2 hours while being sparged with nitrogen. The mixture is held at 450° F. for 1 hour, there being no viscosity increase during this period. The mixture is then cooled to 230° F. over a period of 80 minutes and 12 parts of maleic anhydride are added whereupon the temperature is raised to the range of 400–405° F. in 1 hour and this temperature is maintained for approximately 2 hours to cause the product to increase to a final Gardner-Holdt viscosity of U measured at 77° F. in a 70% solution in mineral spirits. The acid number determined by titration with alcoholic potassium hydroxide is approximately 66. The product is cooled to 280° F. in 1¼ hours and held at this temperature while it is blown with steam for 3–4 hours until the acid value in alcoholic potassium hydroxide is in the range of 103–105 whereas the acid value measured in aqueous potassium hydroxide is in the range of 108–110. The final product is then reduced by dropping the same into a mixture of water, diethyl amine and 2-ethoxy ethanol in order to provide a base-satisfied, water-bearing and water-reducible mixture for subsequent pigmentation. From the standpoint of proportions, 43 parts of the base resin are dropped into 33 parts of water, 4.8 parts of diethyl amine and 18 parts of 2-ethoxy ethanol.

*Example II*

The base-satisfied aqueous solution produced above is pigmented to provide a pigment paste by pebble milling in a cold pebble mill 400 pounds of synthetic iron oxide, 652 pounds of lead silico chromate, and 3.6 gallons of lecithin with 25.65 gallons of the base-satisfied solution of Example I, 2.0 gallons of addiitonal diethyl amine and 14.0 gallons of water. After pebble milling to a uniform primary dispersion, 25.65 gallons of additional base-satisfied aqueous solution of Exampe I are mixed in to provide 100 gallons of base-satisfied aqueous pigment paste.

*Example III*

The base-satisfied aqueous pigment paste of Example II is used in the production of an electrocoating bath composition as follows:

8 gallons of the pigment paste of Example II are mixed with 33 gallons of the base-satisfied aqueous solution of Example I. To this mixture is added, with agitation, 25.5 gallons of an organic solvent solution of oil soluble resin described hereinafter in Example IV. When mixing is completed, 34 gallons of water are added to provide approximately 100 gallons of a final emulsion. This emulsion contains 40% by weight of non-volatile solids of which 22% is constituted by pigment and 78% by resin. The resin content referred to is approximately 47% water soluble resin an approximately 53% oil soluble resin.

In order to use the final emulsion in an electrocoating bath, 100 gallons thereof are agitated overnight with 400 gallons of water to provide 500 gallons of emulsion containing 8–9% of solid material and which is ready for use in the electro-coating process.

*Example IV*

The organic solvent solution of oil soluble resin referred to in the previous example is produced by mixing 1081 pounds of tall oil fatty acid (containing 4% of rosin acids) with 361 pounds of oiticica oil. The mixture is heated to 250° F. in one hour using an inert gas sparge. 480 pounds of rosin are then mixed with 600 pounds of a heat-hardening phenol formaldehyde resin produced by condensing p-t-butyl phenol with a stoichiometric excess of formladehyde and 1699 pounds of styrene-allyl alcohol coplymer A. This mixture is then added to the mixture of tall oil fatty acid and oiticica oil over a period of 40 minutes, dropping the temperature to about 200° F. Heat is then applied to raise the temperature to 400° F. in 1¼ hours and the mixture is held at 400° F. for an additional 2½ hours. The oil-soluble resin so produced is then thinned with 211 gallons of aromatic hydrocarbon solvent ("Solvesso 150") to provide 690 gallons of organic solvent solution having the following specifications:

| | |
|---|---|
| Non-volatile | 72.5%. |
| Solvent | "Solvesso 150." |
| Body | Z6+. |
| Acid number | 35–40. |
| Color | 11–12. |
| Wt./gal. | 8.2–8.3 lbs. |

*Example V*

When the electrocoating bath described in Example III is used, pigment and resin are deposited on the products being coated and it is necessary to maintain the initial composition of the bath. This is effected by separately adding two solutions, one of which is the base-satisfied aqueous pigment paste of Example II and the other of which is the base-deficient, water-free, water insoluble organic solvent solution which is described in this Example V. In practice, the solvent solution of this example is fed into a stream of the bath and which is then fed, via an homogenizer, into the bath itself. This base-deficient solvent solution picks up excess base present in the portion of the bath with which it is mixed thereby causing the resin content of the solution to become water reducible.

Referring first to the base-satisfied aqueous solution of Example I, this was produced by dropping a base resin into a mixture of water, diethyl amine and 2-ethoxy ethanol. To start the production of the organic solvent solution of the present example, 72.5 parts of the base resin of Example I are dropped into 27.5 parts of "Solvesso 150" to produce an aromatic solvent solution of the acidic heat-reaction product which is the base resin of Example I.

The aromatic solvent solution produced above is then mixed with the organic solvent solution of oil soluble resin of Example IV and a small amount of diethyl amine is added together with a small proportion of 2-ethoxy ethanol. Specifically, 43 gallons of the aromatic solvent solution specified above is mixed with 54.7 gallons of the organic solvent solution of oil soluble resin and 2.3 gallons of diethyl amine and 6 gallons of 2-ethoxy ethanol are added slowly until mixing is completed. This final mixture is base-deficient, essentially water-free, and water-insoluble until reaction with excess base in the electrocoating bath converts the product into one which is water reducible. This product of the present Example V is an organic solvent solution and it contains, in solution, the acidic heat-reaction product as well as the at least partially esterified resinous polyol.

When the electrocoating process is carried out, a unidirectional electrical current is passed through the bath causing a coating to deposit on a metal object constituting an anode of the electrical circuit. The coated object is then removed from the electrocoating bath and, while still wet, is overcoated with a guide coat of contrasting color and then the coated object is passed through an oven and baked to cure the coating. It is found that the electrocoating bath of Example III cures well despite the fact that the guide coat blankets the electrodeposited prime coat so that air cannot be relied upon to dry the unsaturated oils in the coating and the heat-hardening phenolformaldehyde condensate enables a good cure to be obtained notwithstanding. In this instance, the achievement of a good cure is easily observed by the fact that enamel topcoats hold out well and are not absorbed into the prime coat.

*Example VI*

Examples I through V are repeated with the exception that in Example IV the heat-hardening phenol formaldehyde resin is replaced by a corresponding weight proportion (600 pounds) of heat-hardening urea formaldehyde resin produced by condensing urea with a stoichiometric excess of formaldehyde. Similar results are obtained.

*Example VII*

Example VI is repeated again, but this time employing 600 pounds of butylated heat-hardening melamine formaldehyde condensate. Corresponding results are again obtained.

*Example VIII*

Another base water soluble resin is made as follows:
2064 pounds of cyclopentadiene-modified linseed oil are admixed with 2064 pounds of dehydrated castor oil and heated to 450° F. in 3 hours while under a nitrogen blanket. The mixture is held at 450° F. for 1 hour, there being no viscosity increase during this period. The mixture is then cooled to 230° F. over a period of 90 minutes and 563 pounds of maleic anhydride are added whereupon the temperature is raised to the range of 380° F. in 1½ hours. Cooling is used as needed to control the exotherm and the temperature is maintained at 380–420° F. for from 1–3 hours until the final Gardner-Holdt viscosity of U is reached, the viscosity being measured at 77° F. in a 70% solution in mineral spirits. The product is cooled to 220° F. in 2¼ hours. The acid number (alcoholic KOH) is about 71.

The mixture is then placed under total reflux and 65 pounds of water are added to the bottom of the kettle over a period of 45 minutes. The heat is increased gradually over 1¼ hours to a temperature of 280° F. which is held for 1 hour until the acid value (alcoholic KOH) is in the range of 100–104 whereas the acid value measured in aqueous KOH is less than 5 units higher. Any unreacted water is then removed by vacuum or sparging. The Gardner-Holdt viscosity at 70% N.V. in mineral spirits should be Z–1—Z–3. The final product is then reduced by dropping the same into a mixture of water, diethyl amine and a mixture of diethylene glycol monoethyl ether and 2-ethoxy ethanol in order to provide a base-satisfied, water-bearing and water-reducible mixture for subsequent pigmentation. From the standpoint of proportions, 43 parts of the base resin are dropped into 33 parts of water, 4.8 parts of diethyl amine and 12.6 parts of 2-ethoxy ethanol and 5.4 parts of the monoethyl ether of diethylene glycol.

*Example IX*

Example II is repeated utilizing the base-satisfied aqueous solution of Example VIII, instead of the base-satisfied solution of Example I to provide the base-satisfied aqueous pigment paste.

*Example X*

The base-satisfied aqueous pigment paste of Example IX is used in the production of an electrocoating bath composition as follows:

8 gallons of the pigment paste of Example IX are mixed with 33 gallons of the base-satisfied aqueous solution of Example VIII. To this mixture is added, with agitation, 25.5 gallons of an organic solvent solution of oil soluble resin described hereinafter in Example XI. When mixing is completed, 34 gallons of water are added to provide approximately 100 gallons of a final emulsion. This emulsion contains 40% by weight of non-volatile solids of which 22% is constituted by pigment and 78% by resin. The resin content referred to is approximately 47% water soluble resin and approximately 53% oil soluble resin. This emulsion is used in the same way as the emulsion of Example III.

*Example XI*

The organic solvent solution of oil soluble resin referred to in the previous example is produced by mixing 1398 pounds of tall oil fatty acid (containing 4% of rosin acids) with 467 pounds of oiticica oil. The mixture is heated to 250° F. in 1¾ hours using an inert gas sparge. 621 pounds of rosin are then mixed with 776 pounds of a heat-hardening phenolformaldehyde resin produced by condensing p-t-butyl phenol with a stoichiometric excess of formaldehyde and 2198 pounds of styrene-allyl alcohol copolymer A. This mixture is then added to the mixture of tall oil fatty acid and oiticica oil over a period of 40 minutes, dropping the temperature to about 200° F. Heat is then applied to raise the temperature to 400° F. in 1¾ hours and the mixture is held at 400° F. for an additional 1 hour to obtain a viscosity of Z-5 and an acid number of 36–38. The oil-soluble resin so produced is then thinned with aromatic hydrocarbon solvent ("Solvesso 150") to provide 930 gallons of organic solvent solution having the following specifications:

| | |
|---|---|
| Non-volatile | 70%. |
| Solvent | "Solvesso 150." |
| Body | Z-5. |
| Acid number | 36–38. |
| Color | 11–12. |
| Wt./gal. | 8.24 lbs. |

*Example XII*

Example X is repeated utilizing the organic solvent solution of oil soluble resin of Example XI to which has been added 10%, based on the weight of the oil soluble resin, of hexamethoxy methyl melamine. Approximately the same results are obtained.

*Example XIII*

Example XII is repeated, but this time the organic solvent solution of oil soluble resin which it utilized is produced as follows:

159 pounds of cyclopentadiene-modified linseed oil are mixed with 159 pounds of dehydrated castor oil and heated to 450° F. in 1½ hours under a nitrogen blanket. The temperature is maintained at 450° F. for 1 hour whereupon the mixture is cooled to 350° F. in 45 minutes and 13 pounds of fumaric acid are added. The temperature is raised to 400° F. in 20 minutes and held at this temperature for 1 hour until a clear cold pill is obtained. The batch is then cooled to 300° F. in 1 hour and 37 pounds of a heat-hardening phenolic resin produced by condensing p-t-butyl phenol with excess formaldehyde are added. The temperature is then raised to 330° F. and held for ½ hour to obtain a Gardner-Holdt viscosity of T (measured at 77° F. at 70% N.V. in mineral spirits) and an acid number of 25. The product is cooled to 275° F. and 41 pounds of hexamethoxy methyl melamine are added and the temperature is maintained for ½ hour to build the viscosity to Z2 (measured at 77° F. at 75% N.V. in Solvesso 150) and an acid number of 18. Sixty-three gallons of product are obtained.

Again, corresponding results are obtained, showing that the polymethylol curing agent may be constituted by a mixture.

When the polymethylol curing agent is hot blended as has been illustrated, the stability of the final electrocoating emulsion is significantly improved which is of especial importance to large scale continuous operation. If desired, the stability of the system can be still further increased by employing an anti-oxidant such as cyclohexanone ketoxime. The invention is defined in the claims which follow.

I claim:
1. An aqueous emulsion adapted for electrophoretic film deposition comprising a continuous aqueous phase having dispersed therein an emulsifying agent consisting essentially of a salt of a base with a film-forming polycarboxylic acid resin substantially free of anhydride groups, and an oil soluble phase stably dispersed in said aqueous phase by means of said emulsifying agent, said oil soluble phase comprising partial fatty ester of hydroxyl bearing resin compatible with said polycarboxylic resin in a deposited film, said oil soluble phase further including heat-hardening formaldehyde condensate reactive with said polycarboxylic resin to cure the same when a deposited film is baked.

2. An aqueous emulsion as recited in claim 1 in which said heat-hardening formaldehyde condensate is incorporated with said hydroxyl bearing resin in an amount of 5–20% thereof.

3. An aqueous emulsion as recited in claim 1 in which said heat-hardening formaldehyde condensate is a condensate of urea, melamine or other triazine with excess formaldehyde.

4. An aqueous emulsion as recited in claim 1 in which said heat-hardening formaldehyde condensate is a condensate of excess formaldehyde with a phenol.

5. An aqueous emulsion as recited in claim 1 in which said hydroxyl bearing resin is hot blended with said heat-hardening formaldehyde condensate.

6. An aqueous emulsion as recited in claim 1 in which the weight ratio of said polycarboxylic acid emulsifying agent to said hydroxyl bearing resin is from 10/90 to 70/30.

7. An aqueous emulsion adapted for electrophoretic film deposition comprising a continuous aqueous phase having dissolved therein an emulsifying agent consisting essentially of a salt of a volatile nitrogenous base with a resinous film forming polycarboxylic acid substantially free of anhydride groups and an oil soluble phase stably dispersed in said aqueous phase, said oil soluble phase comprising oil soluble resin containing functional groups selected from the group consisting of hydroxy groups and carboxy groups, said oil soluble resin being compatible with said emulsifying agent in the deposited film, and from 5–20% of said oil soluble resin of a heat-hardening formaldehyde condensate hot blended with said oil soluble resin, said formaldehyde condensate being a curing agent for said polycarboxylic resin and said oil soluble resin.

8. An aqueous emulsion as recited in claim 7 in which said resinous film forming polycarboxylic acid is an adduct of an unsaturated triglyceride oil with an alpha, beta-ethylenically unsaturated dicarboxylic acid.

9. An aqueous emulsion as recited in claim 8 in which said heat-hardening formaldehyde condensate is a condensate of urea, melamine or other triazine with excess formaldehyde.

10. An aqueous emulsion as recited in claim 8 in which said heat-hardening formaldehyde condensate is a condensate of excess formaldehyde with a phenol.

11. A method of coating a body capable of carrying an electrical current with a uniform weather resistant coating comprising immersing said body in the aqueous emulsion recited in claim 7, passing a unidirectional electrical current through said aqueous emulsion and through said body as anode to deposit a uniform water-insoluble film thereupon, and baking said film to cure the same whereby said formaldehyde condensate can react with said polycarboxylic resin and provide a weather resistant coating.

References Cited

UNITED STATES PATENTS

| | | | |
|---|---|---|---|
| 3,023,177 | 2/1962 | Boucher | 260—29.4 |
| 3,069,368 | 12/1962 | Carney et al. | 260—23 |
| 3,200,057 | 8/1965 | Burnside et al. | 204—181 |
| 3,230,162 | 1/1966 | Gilchrist | 204—181 |
| 3,251,790 | 5/1966 | Christenson et al. | 260—18 |
| 3,293,201 | 12/1966 | Shahade et al. | 260—23 |
| 3,297,557 | 1/1967 | Huggard | 260—18 |

DONALD E. CZAJA, *Primary Examiner.*

LEON J. BERCOVITZ, *Examiner.*

C. W. IVY, *Assistant Examiner.*